US012208675B2

(12) United States Patent
Cattoor et al.

(10) Patent No.: US 12,208,675 B2
(45) Date of Patent: Jan. 28, 2025

(54) MULTI-SPEED TRANSMISSION AND METHOD FOR TRANSMISSION OPERATION

(71) Applicant: Dana Belgium N.V., Flanders (BE)

(72) Inventors: Kurt Cattoor, Koolkerke (BE); Filip D. Schacht, Meulebeke (BE); Filip Van Raepenbusch, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 189 days.

(21) Appl. No.: 17/817,844

(22) Filed: Aug. 5, 2022

(65) Prior Publication Data

US 2024/0042847 A1 Feb. 8, 2024

(51) Int. Cl.
F16H 57/04 (2010.01)
B60K 1/00 (2006.01)
B60K 1/02 (2006.01)
B60K 17/02 (2006.01)
B60K 17/08 (2006.01)
F16H 61/684 (2006.01)
F16H 61/30 (2006.01)

(52) U.S. Cl.
CPC .............. B60K 17/02 (2013.01); B60K 1/00 (2013.01); B60K 1/02 (2013.01); B60K 17/08 (2013.01); F16H 61/684 (2013.01); B60K 2001/001 (2013.01); F16H 57/0473 (2013.01); F16H 61/30 (2013.01); F16H 2200/006 (2013.01); F16H 2200/0082 (2013.01)

(58) Field of Classification Search
CPC ........... F16H 57/0473; F16H 2200/006; F16H 61/684; B60K 17/02

USPC ........................................................ 74/665 F
See application file for complete search history.

(56) References Cited

U.S. PATENT DOCUMENTS

| 4,690,008 | A | * | 9/1987 | Klatt | F16H 61/2807 |
| | | | | | 477/123 |
| 5,199,314 | A | * | 4/1993 | Hutchison | F16H 63/34 |
| | | | | | 74/335 |
| 8,075,437 | B2 | | 12/2011 | Rodgers, II | |
| 2005/0204837 | A1 | * | 9/2005 | Janson | F16H 37/042 |
| | | | | | 74/325 |
| 2007/0113693 | A1 | | 5/2007 | Chen | |
| 2016/0341300 | A1 | * | 11/2016 | Drill | F16D 13/52 |
| 2017/0152933 | A1 | * | 6/2017 | Drill | F16D 13/52 |

FOREIGN PATENT DOCUMENTS

| DE | 202008004052 U1 | 5/2008 |
| EP | 3098103 A1 | 11/2016 |
| KR | 20150069839 A | 6/2015 |

* cited by examiner

Primary Examiner — Ha Dinh Ho
(74) Attorney, Agent, or Firm — McCoy Russell LLP (57) ABSTRACT

Systems and methods for an electric drive unit are provided. A transmission system, in one example, includes a higher-lower range clutch assembly positioned downstream of a multi-speed clutch assembly and designed to shift the transmission system between a higher range operating mode and a lower range operating mode. The higher-lower range clutch assembly includes a lower range clutch and a higher range clutch each positioned on one of a first layshaft and an output shaft.

17 Claims, 5 Drawing Sheets

FIG. 1

| Gear \ Clutch | Low (126) | High (122) | First (160) | Second (164) | Third (162) | Fourth (165) |
|---|---|---|---|---|---|---|
| 1 | X | | X | | | |
| 2 | X | | | X | | |
| 3 | X | | | | X | |
| 4 | X | | | | | X |
| 5 | | X | X | | | |
| 6 | | X | | X | | |
| 7 | | X | | | X | |
| 8 | | X | | | | X |

MULTI-SPEED TRANSMISSION AND METHOD FOR TRANSMISSION OPERATION

TECHNICAL FIELD

The present disclosure relates to a multi-speed transmission system and a transmission shifting method.

BACKGROUND AND SUMMARY

Transmissions are used in vehicles to control propulsive power delivered to drive wheels from a power source such as internal combustion engines or electric motors. Electric vehicles make use of electric drive units to generate motive power and provide an attractive alternative in terms of hydrocarbon emissions in relation to vehicles that solely rely on internal combustion engines for propulsion. However, electric motors may have different gear reduction demands than internal combustion engines. Therefore, gearboxes used in internal combustion engine vehicles may have compatibility issues in certain electric vehicle platforms.

US 2007/0113693 A1 to Chen teaches a multi-speed transmission for a conventional internal combustion engine (ICE). Chen's transmission includes two countershafts that are positioned on opposing sides of an input shaft as well as a Hi-Low shifting device that includes a high torque transmitting mechanism and a low torque transmitting mechanism. These torque transmitting mechanisms are positioned coaxial to one another. Chen's transmission further includes synchronizers coupled to the countershafts.

The inventors have recognized several drawbacks with Chen's transmission as well as other previous transmissions. For instance, positioning the high and low torque transmitting mechanisms coaxial to one another increases the transmission's length which may not align with packaging demands in certain vehicle platforms. Additionally, Chen's transmission transfers power directly from the engine to synchronizer gear reductions via the input shaft. Due this direct power transmission Chen's transmission may not be able to meet gear reduction demands in certain electric drives. Chen's transmission therefore may not be applicable in at least some electric powertrains.

The inventors have recognized the aforementioned issues and developed a transmission system to at least partially overcome the issues. The transmission system includes, in one example, a higher-lower range clutch assembly positioned downstream of a multi-speed clutch assembly and designed to shift the transmission system between a higher range operating mode and a lower range operating mode. In the system, the higher-lower range clutch assembly includes a lower range clutch and a higher range clutch each positioned on one of a first layshaft and an output shaft. Further in the system, the output shaft is designed to rotationally couple to at least one drive axle. In this way, a high-low range clutch arrangement is positioned near the output of the transmission to effectively expand the number of available gear ratios in the transmission. Further, placing the higher and lower range clutches near the transmission output allows the gear range in the upstream multi-speed clutches to be reduced, if so desired. This gear range reduction in the multi-speed clutch zone may result in more equal gear sizes and lower speeds of the gears and shafts. Consequently, transmission longevity is increased. Still further, when the lower range clutch is activated, the load levels circulating through the input section of the transmission are reduced, allowing for a reduction in components size for a similar high power level, if desired.

Further in one example, the multi-speed clutch assembly may include a first set of clutches arranged coaxial to a second layshaft and a second set of clutches arranged coaxial to a third layshaft. In this way, the transmission achieves a wider variety of gear ratios that may achieve a more equal gear spacing due to the downstream positioning of the high-low clutch assembly. Consequently, the transmission achieves enhanced controllability, enhanced driver comfort, and less ratio step variability, if desired when compared to previous transmissions.

Still further in another example, the transmission system additionally includes an input assembly that includes an input gear on an input shaft that is designed to mesh with a gear on an electric machine interface shaft. In this example, the input assembly may further include an output gear that meshes with one or more gears in the multi-speed clutch assembly. Using an input assembly with the aforementioned features allows the comparatively high speed output of an electric motor, when compared to an engine, to be strategically reduced prior to entering the clutch zones in the gearbox.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A transmission system that achieves increased longevity, enhanced controllability, and increased driver comfort is described herein. To achieve these characteristics, the transmission system includes a higher-lower range clutch assembly positioned in a location of the transmission which is downstream of a multi-speed clutch assembly. To elaborate, one of the clutches in the higher-lower range clutch assembly is positioned coaxial to an output shaft of the transmission. In this way, a wide spread, in relation to gear ratio, is created in an output zone, enabling the gear spread in the multi-speed clutch assembly to be reduced, and in turn more equal gear sizes and lower gear and shaft speeds can be achieved, if desired. The decreased shaft and gear speed allows smaller bearings to be used in the system. Further, smaller gear sizes may be used which reduces the transmission's installation envelope. The use of the higher-lower clutch assembly also enables the presence of shaft and clutch overspeed conditions to be avoided. Further, the use of a considerable reduction at the transmission's output, when the low range is activated, reduces the load levels circulating through the gearbox. Lower load on transmission components permits the components have a smaller size for a similar high power level, further decreasing the transmission's space efficiency.

Figure 1:
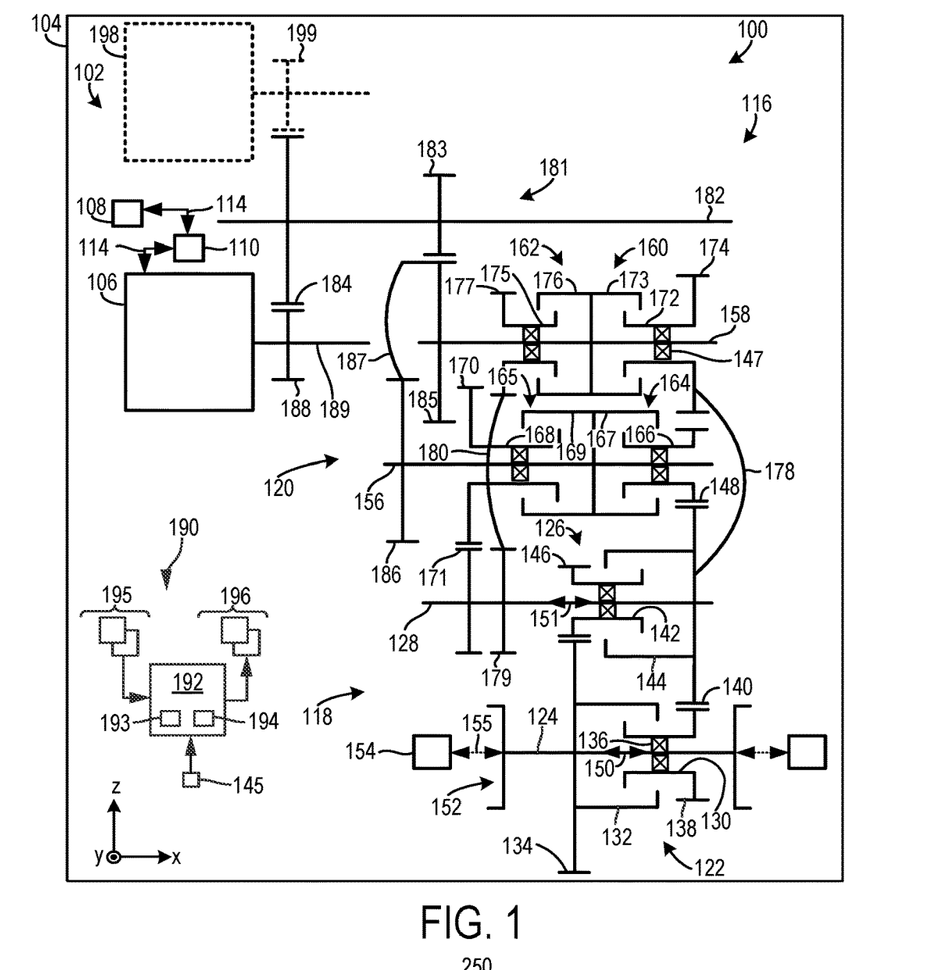
FIG. 1 is a stick diagram of an electric drive unit with a transmission system.

FIG. 1 depicts a transmission system 100. The transmission system 100 in the illustrated example, is included in an electric drive unit 102 of an electric vehicle (EV) 104 (e.g., a battery electric vehicle (BEV)).

The electric drive unit 102 generates motive power for vehicle propulsion. The EV 104 may be an off-highway vehicle such as a material handling, mining, or railway vehicle. More generally, the EV 104 may be a light, medium, or heavy duty vehicle, for instance.

The electric drive unit 102 includes an electric machine 106. The electric machine 106 may include components such as a rotor and a stator that electromagnetically interact during operation to generate motive power. Further in one example, the electric machine may be a motor-generator which is designed to generate electrical energy during regeneration operation.

The electric machine 106 may be electrically coupled to one or more energy storage device(s) 108 (e.g., one or more traction batteries, capacitor(s), fuel cell, combinations thereof, and the like) by way of an inverter 110 when the machine is designed as alternating current (AC) machine. However, a direct current (DC) electric machine may be used in alternate examples.

Arrows 114 denote the electrical connection between the electric machine 106, the inverter 110, and the energy storage device(s) 108. The inverter 110 is designed to convert direct current (DC) to AC and vice versa. In one use-case example, the electric machine 106 and the inverter 110 may be three-phase devices which can achieve greater efficiency when compared to other types of motors. However, motors and inverters designed to operate using more than three phases have been envisioned.

The electric machine 106 is rotationally coupled to the transmission system 100. Further, the transmission system 100 includes a multi-speed transmission 116 (e.g., a multi-speed gearbox) with multiple assemblies. When the multi-speed transmission is used in an EV it may be referred to as an electric multi-speed transmission.

The multi-speed transmission 116 includes a higher-lower range clutch assembly 118 and a multi-speed clutch assembly 120. The higher-lower range clutch assembly 118 is positioned downstream of the multi-speed clutch assembly 120. Positioning these assemblies in this manner creates a wider range of available gear ratios, enabling for a reduction in the gear spread in the multi-speed clutch assembly 120. The reduced gear spread multi-speed clutch assembly results in smaller gear sizes and lower gear and shaft speeds. This also allows clutch and shaft overspeed conditions to be avoided, if desired. The use of a considerable gear reduction at the transmission's output through the use of the higher-lower range clutch assembly 118 allows for a reduction in the load levels circulating through the gearbox, if desired. Lower loads on transmission components enables the components to be downsized for a similar high power level, further increasing the transmission's space efficiency.

The higher-lower range clutch assembly 118 includes a higher range clutch 122 positioned coaxial to an output shaft 124 and a lower range clutch 126 positioned coaxial to a first layshaft 128. However, in another example, the higher range clutch may be positioned coaxial to the first layshaft and the lower range clutch may be positioned coaxial to the output shaft.

The higher range clutch 122 as well as the other clutches described herein may be friction clutches (e.g., wet friction clutches). The friction clutches described herein may be operated with varying amounts of engagement (e.g., continuously adjusted through the clutch's range of engagement) of friction plates and spacers. Further, the friction clutches described herein may be wet friction clutches through which lubricant is routed to increase clutch longevity. The higher range clutch 122 and the other clutches described herein may be adjusted via hydraulic, pneumatic, and/or electro-mechanical actuators. For instance, hydraulically operated pistons may be used to induce clutch engagement of the friction clutches. However, solenoids may be used for electro-mechanical clutch actuation, in other examples. Using friction clutches allows power interruptions during shifting transients to be reduced.

In the friction clutch example, the higher range clutch 122 includes an inner carrier 130 and an outer carrier 132. The inner carrier 130 has a first set of plates mounted thereto and the outer carrier 132 has a second set of plates mounted thereto. These plates frictionally engage when the clutch is closed to permit torque transfer from the inner carrier 130 to the outer carrier 132. Conversely, when the clutch is open the plates are frictionally disengaged. As such, the clutch is in an engaged state when it is closed and a disengaged state when it is open. The outer carrier 132 is fixedly coupled to a gear 134 that is fixedly coupled to the output shaft 124. A bearing 136 serves as the rotational connection between the inner carrier 130 and the output shaft 124. The inner clutch carriers depicted in FIG. 1 are shown coupled to a single bearing. However, it will be understood that the clutch carriers may be coupled to multiple bearings, in other examples. Further, the inner carrier 130 is fixedly coupled to a gear 138 which meshes with a gear 140 coupled to the first layshaft 128.

The lower range clutch 126 again includes an inner carrier 142 and an outer carrier 144 which each have different sets of plates mounted thereto and functions in the similar manner to the higher range clutch 122 with regard to plate engagement and disengagement. The other friction clutches described herein also includes plates the function in a similar manner and repeated description of the plates is omitted for brevity. The inner carrier 142 is fixedly coupled to a gear 146 that meshes with the gear 134. Conversely, the outer carrier 144 is fixedly coupled to the gear 140 that meshes with the gear 138 and a gear 148.

In the illustrated example, the higher and lower range clutches 122 and 126 are axially offset along their rotational axes 150 and 151. In this way, the transmission's space efficiency is increased when compared to clutches that have the same position along their respective rotational axes. However, in other examples, the higher and lower range clutches may have alternate axial positions.

As illustrated, the output shaft 124 includes two mechanical interfaces 152 which are designed to mechanically attach to downstream driveline components such as shafts, joints, and the like that transfer mechanical power to drive axles 154. This mechanical power transfer is denoted via arrows 155. In other examples, the output shaft 124 may include one mechanical interface or more than two mechanical interfaces.

The multi-speed clutch assembly 120 includes multiple clutches arranged on a second layshaft 156 and a third layshaft 158. To elaborate, in the illustrated example, a first pair of clutches which includes a first gear clutch 160 and a third gear clutch 162 are positioned coaxial to the third layshaft 158 and a second pair of clutches which includes a second gear clutch 164 and a fourth gear clutch 165 are positioned coaxial to the second layshaft 156.

The second gear clutch 164 includes an inner carrier 166 and an outer carrier 167. The inner carrier 166 is fixedly coupled to the gear 148 that meshes with the gear 140. The outer carrier 167 if fixedly coupled to the second layshaft 156.

The fourth gear clutch 165 includes an inner carrier 168 and an outer carrier 169. The inner carrier 168 is fixedly coupled to a gear 170 that meshes with a gear 171 on the first layshaft 128. The outer carrier 169 is again fixedly coupled to the second layshaft 156.

The first gear clutch 160 includes an inner carrier 172 and an outer carrier 173. The inner carrier 172 is fixedly coupled to a gear 174 that is rotationally coupled to the gear 140 as denoted via curved line 178. In other words, the gear 174 may mesh with the gear 140. However, in other examples, the gear 174 may be coupled to the gear 140 via a mechanical coupling such as one or more gears, shafts, joints, and the like. The inner carrier 172 is fixedly coupled to the third layshaft 158.

The third gear clutch 162 includes an inner carrier 175 and an outer carrier 176. The inner carrier 175 is fixedly coupled to a gear 177 that is rotationally coupled to a gear 179 on the first layshaft 128 as denoted via curved line 180. In other words, the gear 177 may mesh with the gear 179. However, in other examples, the gear 177 may be coupled to the gear 179 via a mechanical coupling such as one or more gears, shafts, joints, and the like. The inner carrier 175 is fixedly coupled to the third layshaft 158.

The multi-speed transmission 116 further includes, in the illustrated example, an input assembly 181 that includes an input shaft 182 with a gear 183 and a gear 184 fixedly coupled thereto. The gear 183 meshes with a gear 185 fixedly coupled to the third layshaft 158. The gear 185 is rotationally coupled to a gear 186 that is fixedly coupled to the second layshaft 156 as denoted via curved line 187. In other words, the gear 185 may mesh with the gear 186. However, in other examples, the gear 185 may be coupled to the gear 186 via a mechanical coupling such as one or more gears, shafts, joints, and the like. Further, the gear 184 meshes with a gear 188 on an electric machine interface shaft 189. In turn, the electric machine interface shaft 189 is coupled to a rotor shaft in the electric machine 106.

A second electric machine 198 may additionally be coupled to the multi-speed transmission 116, in one example, via a gear 199 that meshes with the gear 184. However, in other examples, the second electric machine 198 may be omitted from the electric drive unit 102.

The output shaft 124 is arranged below the layshafts 128, 156, 158 as well as an input shaft 182. In this way, the transmission achieves a desired drop that has applicability in a wide range of vehicles.

The transmission 116 further includes bearings 147 that are coupled to inner carriers of the clutches and the corresponding shafts that are coaxial to the inner carriers. In this way, the inner carriers can independently rotate with regard to the shafts when the clutches are disengaged.

The EV 104 further includes a control system 190 with a controller 192 as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 192 may receive various signals from sensors 195 coupled to various regions of the EV 104 and the multi-speed transmission 116. For example, the sensors 195 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric machine. An input device 145 (e.g., accelerator pedal, brake pedal, drive mode selector, combinations thereof, and the like) may further provide input signals indicative of an operator's intent for vehicle control.

Upon receiving the signals from the various sensors 195 of FIG. 1, the controller 192 processes the received signals, and employs various actuators 196 of vehicle and/or transmission components to adjust the components based on the received signals and instructions stored on the memory of controller 192. For example, the controller 192 may receive an accelerator pedal signal indicative of an operator's request for increased vehicle acceleration. In response, the controller 192 may command operation of the inverter 110 to adjust electric machine power output and increase the power delivered from the electric machine 106 to the multi-speed transmission 116. The controller 192 may, during certain operating conditions, be designed to send commands to the clutches 122, 126, 160, 162, 164, 165, to engage and disengage the clutches. For instance, a control command may be sent to the higher range clutch 122 and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

An axis system is provided in FIG. 1 as well as FIGS. 2A-2D and 3, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The multi-speed transmission 116 may be designed to operate with an equal number of forward and reverse driving gear modes. For instance, in the illustrated example, the transmission has eight forward and reverse gear modes. However, it will be appreciated that the transmission may be designed with a fewer number of symmetric gear modes. For instance, the transmission may have four or sixteen forward and reverse gear modes.

To operate the multi-speed transmission 116 in a reverse drive mode the electric machine 106 may spin the rotor shaft in an opposite direction as the forward drive mode. Designing the electric machine 106 in this manner allows the compactness of the transmission to be reduced when compared to transmissions with mechanical reverse assemblies.

However, in other examples, the transmission may include a mechanical reverse that decreases the system's space efficiency.

Figure 2A:
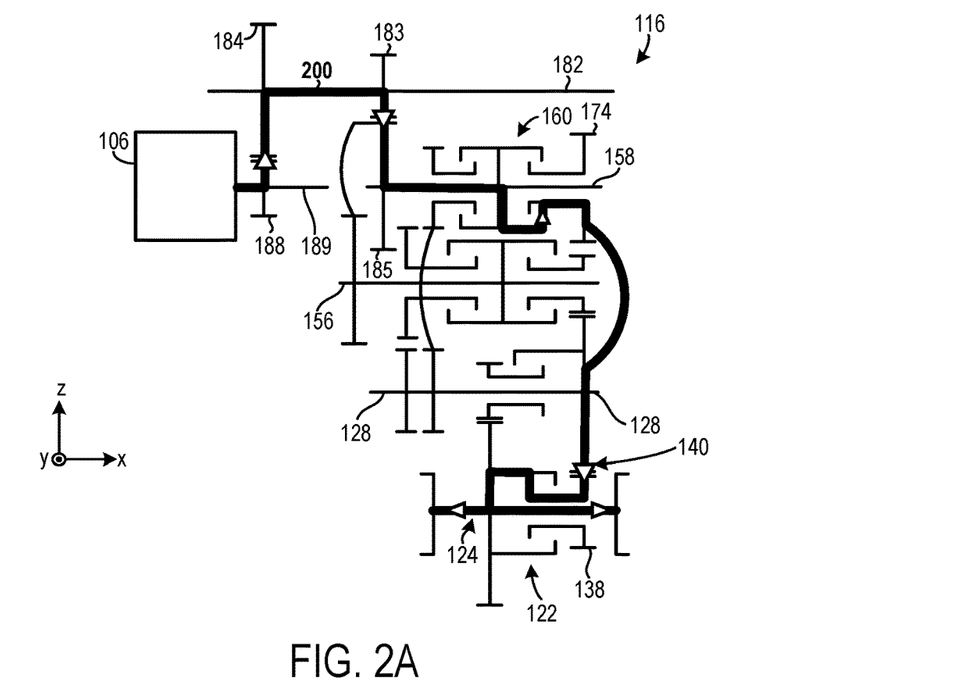
FIGS. 2A-2D are power path diagrams for the different operating gears of the transmission system, depicted in FIG. 1.
Figure 2B:
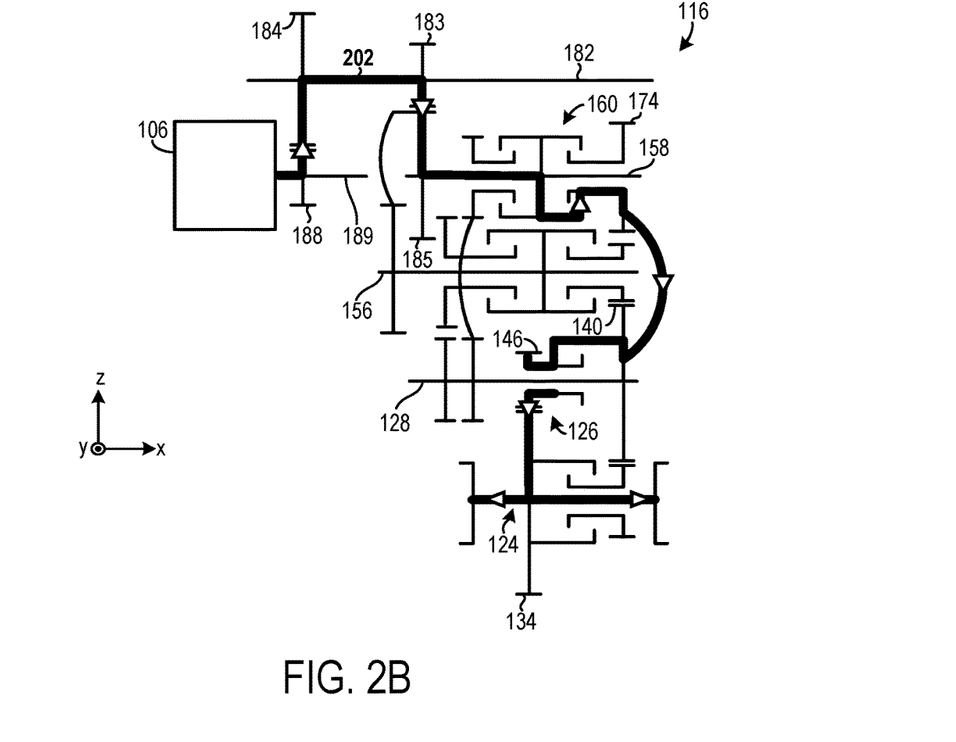

FIGS. 2A and 2B show the power paths 200 and 202 through the multi-speed transmission 116 in a higher-range mode and a lower-range mode respectively. It will be understood that these power paths may correspond to both forward and reverse drive modes. Further, the electric machine may generate rotational output in opposite directions in the forward and reverse drive modes. In other words, in a forward drive mode, the electric machine may rotate the electric machine interface shaft 189 in a first direction and in a reverse drive mode, it may rotate the output shaft in the opposite direction. Thus, the power paths shown in FIGS. 2A and 2B generally correspond to drive mode operation.

As illustrated in FIG. 2A, while the transmission 116 is operating in the higher-range mode, the higher range clutch 122 and the first gear clutch 160 are engaged while the remainder of the clutches are disengaged. However, it will be understood that the transmission may be operated in the higher-range mode in the second, third, and fourth gears where the respective second, third, or fourth clutch is engaged while the remainder of the multi-speed clutches are disengaged.

The mechanical power path 200 unfolds as follows: mechanical power moves from the electric machine 106 to the gear 188; from the gear 188 to the gear 184; from the gear 184 to the input shaft 182; from the input shaft to the gear 183; from the gear 183 to the gear 185; from the gear 185 to the third layshaft 158; from the third layshaft to the first gear clutch 160; from the first gear clutch to the gear 174; from the gear 174 to the gear 140; from the gear 140 to the gear 138; and from the gear 138 to the output shaft 124 via the clutch 122; and from the output shaft to downstream components. As such, the power path 200 bypasses the second layshaft 156.

While the transmission 116 is operating in the lower range mode, as shown in FIG. 2B, the lower range clutch 126 and the first gear clutch 160 are engaged while the remainder of the clutches in the transmission are disengaged.

The mechanical power path 202 unfolds as follows: mechanical power moves from the electric machine 106 to the gear 188; from the gear 188 to the gear 184; from the gear 184 to the input shaft 182; from the input shaft to the gear 183; from the gear 183 to the gear 185; from the gear 185 to the third layshaft 158; from the third layshaft to the first gear clutch 160; from the first gear clutch to the gear 174; from the gear 174 to the lower range clutch 126 via the gear 140; from the lower range clutch to the gear 146; from the gear 146 to the gear 134; from the gear 134 to the output shaft 124; and from the output shaft to downstream components. As such, the power path 202 bypasses the second layshaft 156.

Figure 2C:
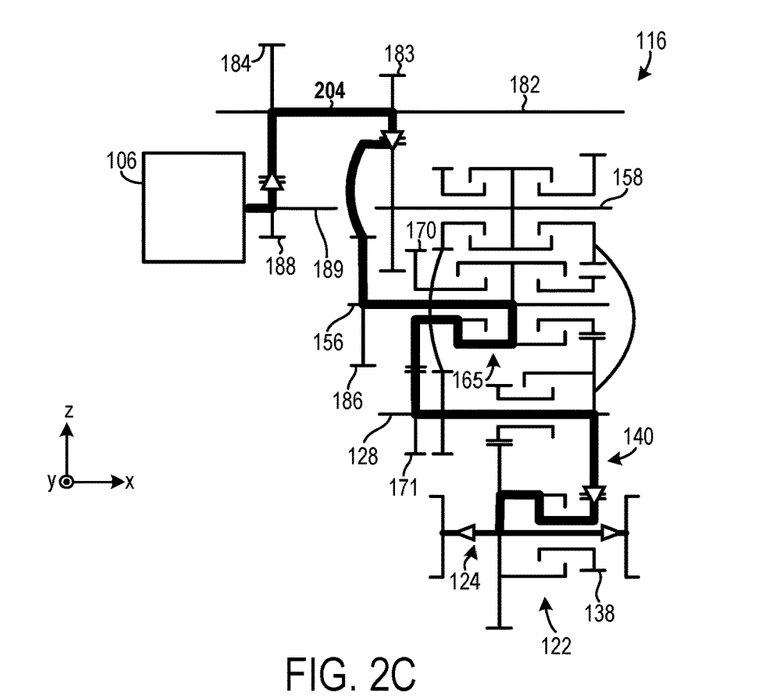
Figure 2D:
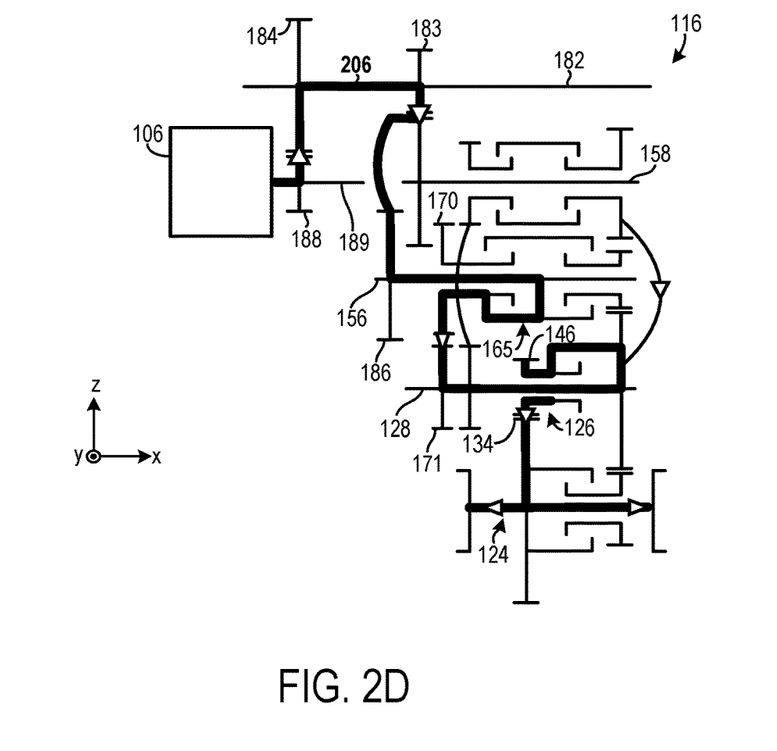

FIGS. 2C and 2D show the power paths 204 and 206 through the multi-speed transmission 116 in a higher-range mode and a lower-range mode respectively, with different gears in the multi-speed clutch zone than FIGS. 2A and 2B.

As illustrated in FIG. 2C, while the transmission 116 is operating in the higher-range mode, the higher range clutch 122 and the fourth gear clutch 165 are engaged while the remainder of the clutches are disengaged.

The mechanical power path 204 unfolds as follows: mechanical power moves from the electric machine 106 to the gear 188; from the gear 188 to the gear 184; from the gear 184 to the input shaft 182; from the input shaft to the gear 183; from the gear 183 to the gear 186; from the gear 186 to the second layshaft 156; from the second layshaft to the fourth gear clutch 165; from the fourth gear clutch to the gear 170; from the gear 170 to the first layshaft 128 via the gear 171; from the first layshaft to the gear 140; from the gear 140 to the gear 138; from the gear 138 to the higher range clutch 122; from the higher range clutch 122 to the output shaft 124; and from the output shaft to downstream components. As such, in the higher range mode of operation, the power path 204 bypasses the second layshaft 156 and the first layshaft 128. As such, in the higher range mode of operation, the power path 204 bypasses the third layshaft 158.

As illustrated in FIG. 2D, while the transmission 116 is operating in the lower-range mode, the lower range clutch 126 and the fourth gear clutch 165 are engaged while the remainder of the clutches are disengaged.

The mechanical power path 206 unfolds as follows: mechanical power moves from the electric machine 106 to the gear 188; from the gear 188 to the gear 184; from the gear 184 to the input shaft 182; from the input shaft to the gear 183; from the gear 183 to the gear 186; from the gear 186 to the second layshaft 156; from the second layshaft to the fourth gear clutch 165; from the fourth gear clutch to the gear 170; from the gear 170 to the first layshaft 128 via the gear 171; from the first layshaft to the lower range clutch 126; from the lower range clutch 126 to the gear 146; from the gear 146 to the gear 134; from the gear 134 to the output shaft 124; and from the output shaft 124 to downstream components. As such, the power path 206 bypasses the third layshaft 158.

Figure 2E:
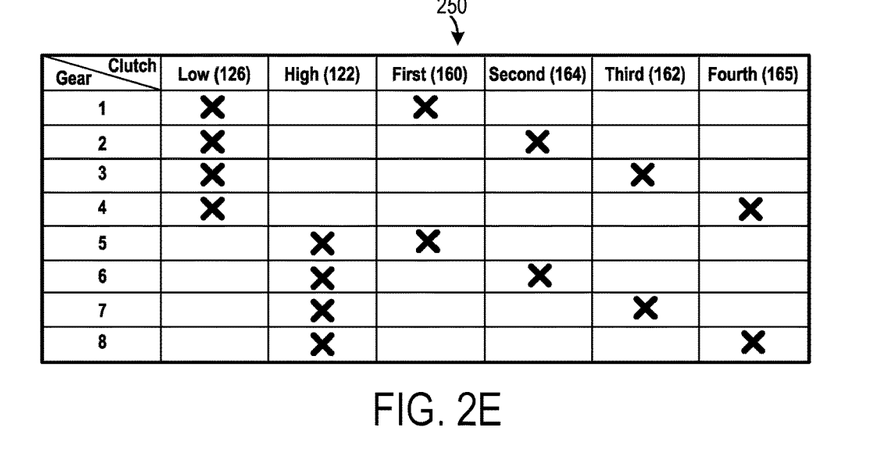
FIG. 2E is a table that indicates configurations of the clutches in the operating gears of the transmission system, depicted in FIG. 1.

FIG. 2E shows a table 250 that indicates the configurations of lower range clutch 126, the higher range clutch 122, the first gear clutch 160, the second gear clutch 164, the third gear clutch 162, and the fourth gear clutch 165. As shown, the transmission can be operated in eight forward and reverse gears.

Figure 3:
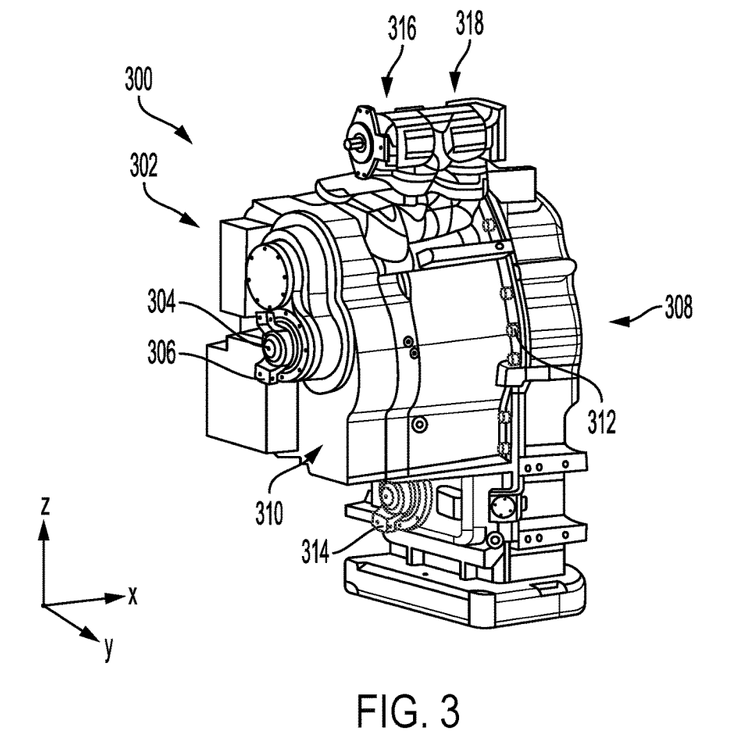
FIG. 3 is a detailed illustration of an exemplary transmission system.

FIG. 3 shows an example of a multi-speed transmission 300. The multi-speed transmission 300 shares similarities with the multi-speed transmission 116, shown in FIG. 1. For instance, the multi-speed transmission 300 includes a higher-lower range clutch assembly positioned downstream of a multi-speed clutch assembly. Redundant description of the overlapping features is omitted for brevity.

The multi-speed transmission 116 includes a housing 302 with an electric machine interface shaft 304 with an interface 306 that is profiled to attach to a rotor shaft of an electric machine.

The housing 302 includes two main sections 308 and 310 that are attached to one another via fasteners 312 and/or other suitable attachment devices. However, other housing contours may be used in other examples. The housing 302 at least partially encloses an input assembly, a range clutch assembly, and a multi-speed clutch assembly.

A mechanical output interface 314 is further included in the transmission 300. The interface 314 is positioned below the electric machine interface 306. In this way, the transmission may achieve a desired amount of drop. A charging pump 316 may further be included in the transmission 300. The charging pump 316 may be driven via an electric motor 318 that is distinct from the traction motor. Further, the charging pump may be designed to provide pressurized fluid (e.g., oil) to the clutches for actuation and/or lubrication, in one example. In this way, a space efficient transmission unit with charging pump functionality can be achieved, if desired.

Figure 4:
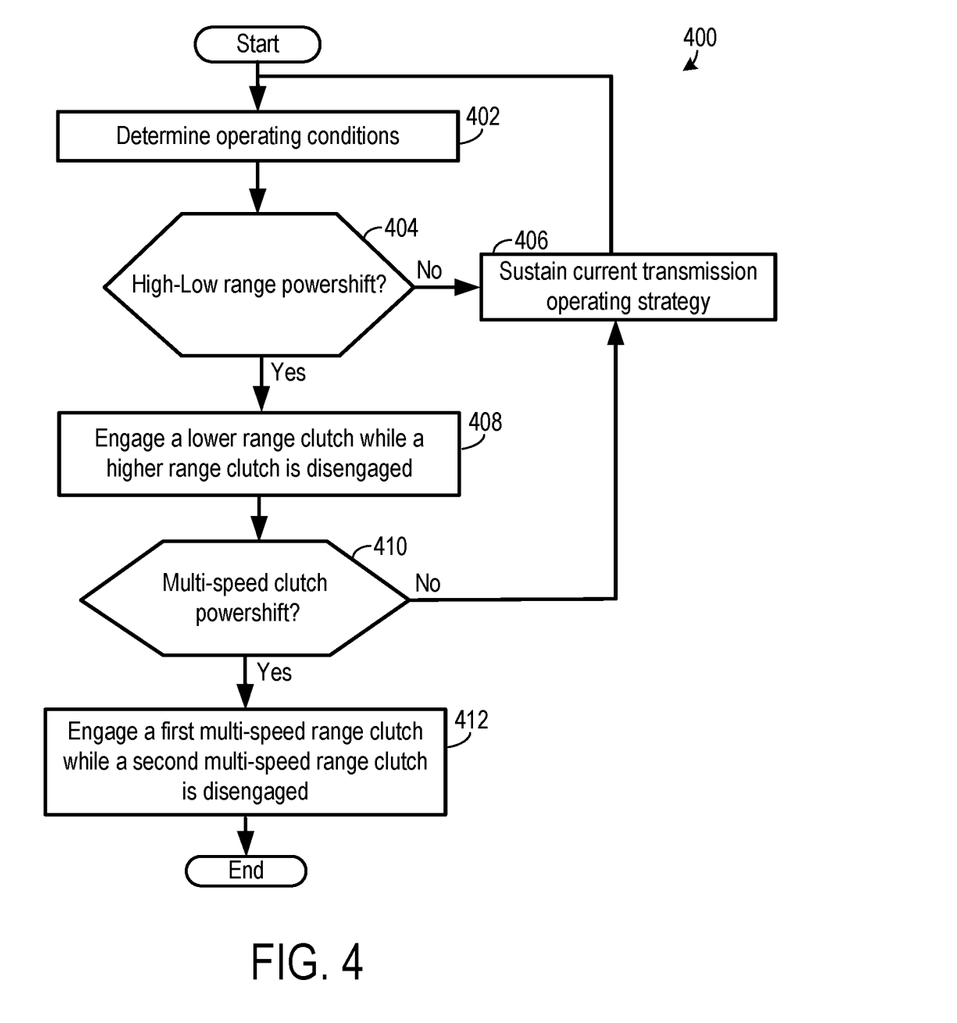
FIG. 4 is a method for operation of a multi-speed transmission in an electric drive unit.

FIG. 4 shows a method 400 for operation of a transmission system. The method 400 may be carried out by any of the transmission systems or combinations of the transmission system described herein with regard to FIGS. 1-3B. However, the method 400 may be carried via other suitable transmissions, in other examples. Furthermore, the method 400 may be implemented by a controller that includes a processor and memory, as previously discussed. Method 400 specifically shows a downshift sequence. However, it will be appreciated that an upshift sequence may be similarly implemented where the higher range clutch is engaged while the lower range clutch is disengaged.

At 402, the method includes determining operating conditions. The operating conditions may include input device position (e.g., gearshift lever position), clutch configuration, transmission speed, motor speed, vehicle speed, vehicle load, ambient temperature, and the like. The operating conditions may be ascertained via sensor inputs, modeling, look-up tables, and/or other suitable techniques.

Next at 404, the method includes judging if a high-low range powershift in the transmission should be implemented. Such as determination may be carried out responsive to vehicle speed surpassing a threshold value, in one example. In other examples, operator interaction with gear selector may initiate powershift operation.

If it is determined that a high-low range powershift should not occur (NO at 404) the method moves to 406 where the method includes sustaining the current transmission operating strategy. For instance, the transmission may be maintained in its current operating gear.

Conversely, if it is determined that a high-low range powershift should occur (YES at 404) the method moves to 408 where the method includes engaging a lower range clutch and disengaging a higher range clutch while power delivery from the electric machine to the transmission is sustained to transition from higher range operating mode to the lower range operating mode. In this way, the shift may occur with little or no power interruption, if wanted.

Next at 410, the method includes judging if a multi-speed clutch powershift in the transmission should be implemented. Such as determination may be carried out responsive to vehicle speed surpassing a threshold value, in one example. In other examples, operator interaction with gear selector may initiate powershift operation.

If it is determined that a multi-speed clutch powershift should not occur (NO at 410) the method moves to 406. Conversely, if it is determined that a high-low range powershift should occur (YES at 410) the method moves to 412 where the method includes engaging one of the gear clutches while disengaging another gear clutch. In this way, the shift may again occur with little or no power interruption, if wanted.

Figure 5:
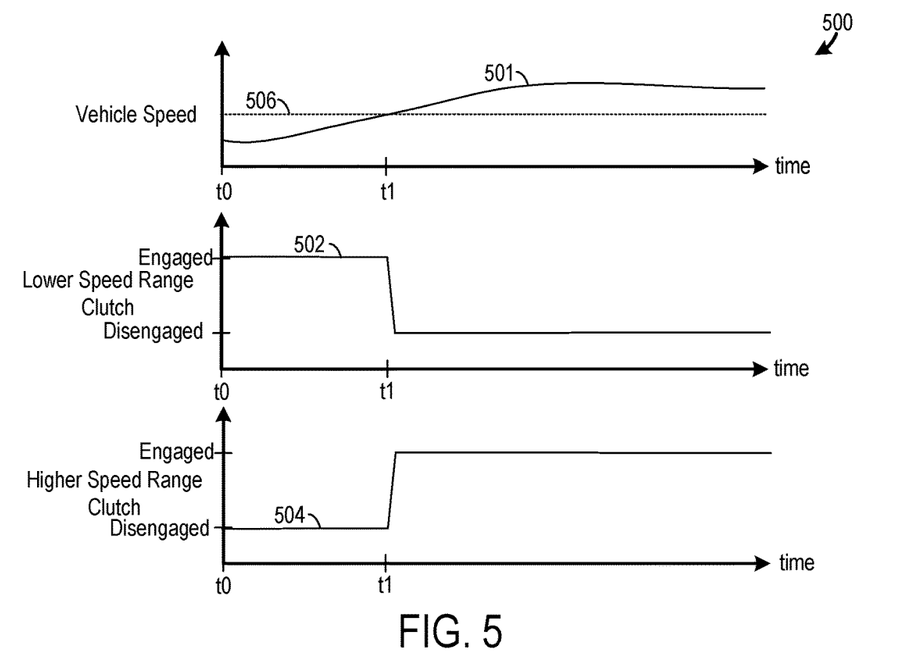
FIG. 5 is a timing diagram for a use-case transmission control strategy.

FIG. 5 illustrates a timing diagram 500 of a use-case control strategy for a transmission system, such as any of the previously described transmissions or combinations of the transmissions. In each graph, time is indicated on the abscissa and increases from left to right. The ordinate for plot 501 indicates vehicle speed. The ordinates for plots 502 and 504 indicate the operational states ("Engaged" and "Disengaged") of the lower and higher range clutches. Other parameters that may trigger an up-shift or a down-shift include load, throttle pedal position, and the like.

From t0 to t1 the vehicle speed increases and at t1 the speed surpasses a threshold value 506. Responsive to the vehicle speed surpassing the threshold value a powershifting event occurs where the lower range clutch transitions into a disengaged state and the higher range clutch transitions into an engaged state. It will be understood that the specific clutch control strategy may be more nuanced, in practice. For instance, clutch pressure in the clutches may be less abruptly ramped up and down to allow a smoother transition into the higher range mode to occur and reduce the likelihood of unwanted noise, vibration, and harshness (NVH).

The technical effect of the transmission systems and operating methods described herein is to efficiently transition between the transmission's discrete gears with a decreased amount of power interruption and/or provide a technique which allows the transmission to achieve a targeted range of gear ratios in a space efficient package.

FIG. 3 is drawn approximately to scale. Although other relative component dimensions may be used, in other embodiments.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission system is provided that comprises a higher-lower range clutch assembly positioned downstream of a multi-speed clutch assembly and designed to shift the transmission system between a higher range operating mode and a lower range operating mode; wherein the higher-lower range clutch assembly includes a lower range clutch and a higher range clutch each positioned on one of a first layshaft and an output shaft; and wherein the output shaft is designed to rotationally couple to at least one drive axle.

In another aspect, a method for operation of a transmission system is provided that comprises during a first operating condition, operating a higher-lower range clutch assembly positioned downstream of a multi-speed clutch assembly to shift the transmission system between a higher range operating mode and a lower range operating mode; wherein the higher-lower range clutch assembly is positioned downstream of the multi-speed clutch assembly; wherein the higher-lower range clutch assembly includes a lower range clutch and a higher range clutch each positioned on one of a first layshaft and an output shaft; and wherein the output shaft is designed to rotationally couple to a drive axle. In one example, the method may further include during a second operating condition, operating the multi-speed clutch assembly to powershift the transmission system between two gear speed modes. In yet another example the method may further include operating an electric motor to drive a charging pump, wherein the electric motor and the charging pump are coupled to a housing of the transmission system.

In yet another aspect, an electric transmission system is provided that comprises a higher-lower range clutch assembly positioned downstream of a multi-speed clutch assembly and designed to shift the electric transmission system between a higher range operating mode and a lower range operating mode; wherein the higher-lower range clutch assembly includes a lower range friction clutch and a higher range friction clutch each positioned on one of a first layshaft and an output shaft; and wherein the output shaft is designed to rotationally couple to a drive axle.

In any of the aspects or combinations of the aspects, the multi-speed clutch assembly may include a first set of clutches arranged coaxial to a second layshaft and a second set of clutches arranged coaxial to a third layshaft.

In any of the aspects or combinations of the aspects, the first and second sets of clutches may each include two or more friction clutches.

In any of the aspects or combinations of the aspects, the higher range clutch and the lower range clutch may be friction clutches.

In any of the aspects or combinations of the aspects, the transmission system may be designed with an equal number of forward and reverse driving gear modes.

In any of the aspects or combinations of the aspects, the transmission system may further comprise an input assembly that includes an input gear on an input shaft that is designed to mesh with a gear on an electric machine interface shaft.

In any of the aspects or combinations of the aspects, the input assembly may further include an output gear that meshes with one or more gears in the multi-speed clutch assembly.

In any of the aspects or combinations of the aspects, the input shaft may be positioned above an electric machine interface shaft.

In any of the aspects or combinations of the aspects, the transmission system may further include a charging pump driven by an electric motor coupled to a housing of the transmission system.

In any of the aspects or combinations of the aspects, the input shaft may be positioned above the output shaft.

In any of the aspects or combinations of the aspects, the output shaft may be rotationally coupled to multiple drive axles.

In any of the aspects or combinations of the aspects, operating the higher-lower range clutch assembly to shift the transmission system between the higher range operating mode and the lower range operating mode may be implemented during a reverse driving operating condition.

In any of the aspects or combinations of the aspects, the system may further comprise an input assembly that includes an input gear on an input shaft that is designed to mesh with a gear on a first electric machine interface shaft.

In any of the aspects or combinations of the aspects, the input gear may be designed to mesh with a gear on the output shaft of a second electric machine.

In any of the aspects or combinations of the aspects, the input shaft may be positioned above the output shaft and the first electric machine interface shaft.

In any of the aspects or combinations of the aspects, the first layshaft and the output shaft may be positioned below the first electric machine interface shaft.

In another representation, a symmetric powershift transmission in an electric vehicle is provided that includes a high-low range clutch section positioned downstream of a multi-speed clutch section, coupled to an output shaft, and including a high range clutch positioned on the output shaft and a low range clutch positioned on a layshaft that is above the output shaft.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the electric drive unit and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
a higher-lower range clutch assembly positioned downstream of a multi-speed clutch assembly and designed to shift the transmission system between a higher range operating mode and a lower range operating mode;
wherein the higher-lower range clutch assembly includes a lower range clutch and a higher range clutch each positioned on one of a first layshaft and an output shaft;
wherein the output shaft is designed to rotationally couple to at least one drive axle; and
wherein the transmission system is designed with an equal number of forward and reverse driving gear modes.

2. The transmission system of claim 1, wherein the multi-speed clutch assembly includes a first set of clutches arranged coaxial to a second layshaft and a second set of clutches arranged coaxial to a third layshaft.

3. The transmission system of claim 2, wherein the first and second sets of clutches each include two or more friction clutches.

4. The transmission system of claim 1, wherein the higher range clutch and the lower range clutch are friction clutches.

5. The transmission system of claim 1, further comprising an input assembly that includes an input gear on an input shaft that is designed to mesh with a gear on an electric machine interface shaft.

6. The transmission system of claim 5, wherein the input assembly further includes an output gear that meshes with one or more gears in the multi-speed clutch assembly.

7. The transmission system of claim 5, wherein the input shaft is positioned above an electric machine interface shaft.

8. The transmission system of claim 1, further comprising a charging pump driven by an electric motor coupled to a housing of the transmission system.

9. The transmission system of claim 1, further comprising an input shaft positioned above the output shaft.

10. The transmission system of claim 9, wherein the output shaft is rotationally coupled to multiple drive axles.

11. A method for operation of a transmission system, comprising:
during a first operating condition, operating a higher-lower range clutch assembly positioned downstream of a multi-speed clutch assembly to shift the transmission system between a higher range operating mode and a lower range operating mode; and
operating an electric motor to drive a charging pump, wherein the electric motor and the charging pump are coupled to a housing of the transmission system;
wherein the higher-lower range clutch assembly is positioned downstream of the multi-speed clutch assembly;
wherein the higher-lower range clutch assembly includes a lower range clutch and a higher range clutch each positioned on one of a first layshaft and an output shaft; and
wherein the output shaft is designed to rotationally couple to a drive axle.

12. The method of claim 11, wherein operating the higher-lower range clutch assembly to shift the transmission system between the higher range operating mode and the lower range operating mode is implemented during a reverse driving operating condition.

13. The method of claim 11, further comprising during a second operating condition, operating the multi-speed clutch assembly to powershift the transmission system between two gear speed modes.

14. An electric transmission system, comprising:
a higher-lower range clutch assembly positioned downstream of a multi-speed clutch assembly and designed to shift the electric transmission system between a higher range operating mode and a lower range operating mode; and
an input assembly that includes an input gear on an input shaft that is designed to mesh with a gear on a first electric machine interface shaft;
wherein the higher-lower range clutch assembly includes a lower range friction clutch and a higher range friction clutch each positioned on one of a first layshaft and an output shaft; and
wherein the output shaft is designed to rotationally couple to a drive axle.

15. The electric transmission system of claim 14, wherein the input gear is designed to mesh with a gear on the output shaft of a second electric machine.

16. The electric transmission system of claim 14, wherein the input shaft is positioned above the output shaft and the first electric machine interface shaft.

17. The electric transmission system of claim 14, wherein the first layshaft and the output shaft are positioned below the first electric machine interface shaft.

* * * * *